United States Patent
Enoki et al.

(10) Patent No.: US 7,293,404 B2
(45) Date of Patent: Nov. 13, 2007

(54) CONTROL DEVICE FOR INTERNAL COMBUSTION ENGINE

(75) Inventors: Keiichi Enoki, Tokyo (JP); Kuen Yehliu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/326,403

(22) Filed: Jan. 6, 2006

(65) Prior Publication Data

US 2007/0033924 A1    Feb. 15, 2007

(30) Foreign Application Priority Data

Aug. 9, 2005    (JP)   ............ P2005-230653

(51) Int. Cl.
*F01N 3/00*    (2006.01)

(52) U.S. Cl. ............ 60/277; 60/274; 60/276; 60/285; 701/103

(58) Field of Classification Search .......... 60/274, 60/276, 277, 285; 701/103, 115
See application file for complete search history.

(56) References Cited

U.S. PATENT DOCUMENTS 5,579,637 A * 12/1996 Yamashita et al. ............ 60/276
5,735,120 A * 4/1998 Nagai ........................ 60/276
5,851,376 A * 12/1998 Nishioka et al. ......... 205/784.5
6,594,987 B2 * 7/2003 Uranishi ..................... 60/277
6,751,950 B2 * 6/2004 Ikemoto et al. ............. 60/285
6,761,024 B2 * 7/2004 Uchida ....................... 60/277

FOREIGN PATENT DOCUMENTS

JP    11-270332 A    10/1999

* cited by examiner

*Primary Examiner*—Binh Q. Tran
(74) *Attorney, Agent, or Firm*—Sughrue Mion Pllc.

(57) ABSTRACT

A device includes: downstream air-fuel ratio feedback control unit that performs feedback control of an upstream target air-fuel ratio so that a downstream air-fuel ratio detected by a downstream air-fuel ratio detecting unit coincides with a downstream target air-fuel ratio; a target air-fuel ratio varying unit that varies the upstream target air-fuel ratio at the time of diagnosing degradation of a ternary catalyst; and a catalyst degradation judging unit that judges catalyst degradation from the behavior of the downstream air-fuel ratio at the time of diagnosing degradation of the ternary catalyst. When diagnosing degradation of the ternary catalyst, the downstream air-fuel ratio feedback control unit is stopped or its control constant is set at a smaller value. Thus, when varying the air-fuel ratio for diagnosing catalyst degradation, interference between downstream air-fuel ratio feedback and upstream air-fuel ratio feedback is prevented and catalyst degradation is accurately diagnosed.

5 Claims, 12 Drawing Sheets

CONTROL DEVICE FOR INTERNAL COMBUSTION ENGINE

BACKGROUND OF THE INVENTION

1. Field of the Invention

This invention relates to a control device for internal combustion engine and particularly to a new technique for securely detecting degradation of a ternary catalyst for exhaust gas purification.

2. Description of the Related Art

Generally, in an internal combustion engine, a ternary catalyst containing noble metal such as platinum, rhodium or palladium is used; and at the same time, harmful gas (HC, CO and NOx) contained in the exhaust gas is purified to harmless gas by this ternary catalyst. The purification effect of the catalyst is maintained at a high level near the stoichiometric ratio but it is significantly lowered away from the stoichiometric ratio.

The ternary catalyst contains auxiliary catalysts such as alumina and ceria in addition to the noble metal. These auxiliary catalysts function to prevent thermal degradation of the noble metal. Of the auxiliary catalysts, ceria has such an oxygen occlusion capability as to occlude oxygen when the air-fuel ratio is leaner than the stoichiometric ratio and to release oxygen when the air-fuel ratio is rich than the stoichiometric ratio. It can maintain a constant stoichiometric ratio even when the air-fuel ratio in the ternary catalyst varies. Therefore, even when the air-fuel ratio upstream from the catalyst is varied by acceleration or deceleration, the oxygen occlusion capability of ceria keeps the stoichiometric ratio in the catalyst and thus maintains high purification capability of the catalyst.

FIG. 13 is an explanatory view showing the results of installing air-fuel ratio sensors upstream and downstream from the ternary catalyst and actually measuring the air-fuel ratio downstream from a ternary catalyst in the case where the air-fuel ratio upstream from the ternary catalyst is varied. Case A shows the air-fuel ratio measured downstream from a new ternary catalyst. Case B shows the air-fuel ratio measured downstream from a ternary catalyst that is thermally degraded by accidental fire or the like in the engine. As is clear from Case A shown in FIG. 13, when a new ternary catalyst is used, even if the upstream air-fuel ratio is varied, the stoichiometric ratio is maintained in the ternary catalyst by the oxygen occlusion capability of ceria and the air-fuel ratio downstream from the ternary catalyst is substantially constant without varying.

However, if an accidental fire or the like occurs in the engine and thermally deteriorates the ternary catalyst, the oxygen occlusion capability of ceria is lowered, deteriorating the catalyst purification capability. Therefore, as in Case B shown in FIG. 13, when the upstream air-fuel ratio is varied, the air-fuel ratio downstream from the ternary catalyst varies in accordance with the variation of the air-fuel ratio upstream from the ternary catalyst.

FIG. 14 is an explanatory view showing the relation between the oxygen occlusion capability, and the quantity of non-methane hydrocarbon NMHC (g/mile) and the quantity of nitrogen oxide NOx (g/mile) as the quantities of exhaust gas for the traveling in the United States emission control mode, in the case where the ternary catalyst is thermally degraded by forced accidental fire. As is clear from FIG. 14, as the thermal degradation of the ternary catalyst becomes serious, the oxygen occlusion capability is reduced. Along with the reduction in the oxygen occlusion capability, the quantity of exhaust gas increases and deteriorates. Therefore, if the air-fuel ratio upstream from the degraded ternary catalyst is varied, the air-fuel ratio downstream from the catalyst varies in accordance with the variation of the air-fuel ratio upstream from the ternary catalyst, as in Case B shown in FIG. 13. This means that ceria is degraded and therefore cannot absorb oxygen changes upstream from the ternary catalyst because its oxygen occlusion capability is lowered.

In Europe and the United States, on-board diagnosis control (OBD control) has been enforced to detect deterioration of the performance of the emission system. The OBD control includes detection of degradation of the ternary catalyst as described above. For example, if the ternary catalyst is so degraded that the quantity of exhaust gas exceeds the OBD control level as shown in FIG. 14, a malfunction indicator light (MIL) must be turned on to notify the driver of the malfunction.

Thus, conventionally, a device has been disclosed in which a linear air-fuel ratio sensor that can linearly detect the air-fuel ratio is provided upstream from the ternary catalyst, whereas a rear $\lambda$ sensor having its output largely changed near the stoichiometric ratio is provided downstream, and in which the air-fuel ratio upstream from the ternary catalyst is varied and a predetermined quantity of oxygen change is given to the ternary catalyst to diagnose degradation of the catalyst from the behavior of the downstream rear $\lambda$ sensor (see, for example, Patent Reference 1).

With this conventional device, the quantity of oxygen change is set to the oxygen occlusion capability of the OBD detection level (for example, value (A) in FIG. 14). If the oxygen occlusion capability is higher than the quantity of oxygen change, the oxygen change is absorbed and the output of the rear $\lambda$ sensor is stable. However, if the ternary catalyst is degraded and the oxygen occlusion capability becomes lower than the quantity of oxygen change, the oxygen change cannot be sufficiently absorbed and the output of the rear $\lambda$ sensor largely varies. Thus, the degradation of the catalyst can be accurately detected.

Patent Reference 1: JP-A-11-270332 (FIGS. 1 to 4, Pages 2 to 6)

However, the air-fuel ratio control system generally performs double-feedback control, that is, feedback control of a target-upstream air-fuel ratio by using the rear $\lambda$ sensor so as to achieve a target downstream air-fuel ratio, and feedback control of the quantity of fuel injection by using the linear air-fuel sensor so as to achieve a target upstream air-fuel ratio. Therefore, if the above-described conventional technique for diagnosing the degradation of the ternary catalyst is applied, the two feedback controls interfere with each other to cause hunting of the air-fuel ratios upstream and downstream from the ternary catalyst, thus deteriorating emission (particularly NOx) and drivability, lowering the accuracy of the diagnosis of the catalyst degradation, and causing misjudgment, as shown in FIG. 15.

Also, as shown in FIG. 12, if the air-fuel ratio is varied while the central value of air-fuel ratio variation (basic target A/F) remains deviated from the stoichiometric ratio, the oxygen occlusion capability E is saturated and the rear λ sensor output F does not vary, or conversely, the oxygen occlusion capability E is reduced to zero and the rear λ sensor output F does not vary (not shown). Thus, there is a problem that accurate diagnosis of the catalyst degradation cannot be made.

Moreover, in the conventional device, since the air-fuel ratio is varied in step waveforms, the air-fuel ratio changes largely and too acutely, as shown in FIG. 11. Therefore, the air-fuel ratio is not converged to a target value, causing hunting and deteriorating drivability.

SUMMARY OF THE INVENTION

In view of the foregoing problems in the conventional device, it is an object of this invention to provide a control device for internal combustion engine that enables prevention of deterioration in the emission and drivability and improvement in the accuracy of the diagnosis of catalyst degradation.

A control device for internal combustion engine according to this invention includes: a ternary catalyst arranged in an exhaust system of an internal combustion engine; an upstream air-fuel ratio detecting unit that is arranged in the exhaust system upstream from the ternary catalyst and detects an upstream air-fuel ratio of exhaust gas of the internal combustion engine; an upstream air-fuel ratio feedback control unit that performs feedback control of the quantity of fuel injection to the internal combustion engine so that the upstream air-fuel ratio detected by the upstream air-fuel ratio detecting unit coincides with an upstream target air-fuel ratio; a downstream air-fuel ratio detecting unit that is arranged in the exhaust system downstream from the ternary catalyst and detects a downstream air-fuel ratio of the exhaust gas; a downstream air-fuel ratio feedback control unit that performs feedback control of the upstream target air-fuel ratio so that the downstream air-fuel ratio detected by the downstream air-fuel ratio detecting unit coincides with a downstream target air-fuel ratio; a target air-fuel ratio varying unit that varies the upstream target air-fuel ratio at the time of diagnosing degradation of the ternary catalyst; and a catalyst degradation judging unit that judges degradation of the catalyst from the behavior of the downstream air-fuel ratio at the time of diagnosing degradation of the ternary catalyst; wherein at the time of diagnosing degradation of the ternary catalyst, the downstream air-fuel ratio feedback control unit is stopped or its control constant is set at a smaller value.

The control device for internal combustion engine according to this invention further includes an upstream target air-fuel ratio learning unit that learns the upstream target air-fuel ratio, and a learning completion judging unit that judges that the upstream target air-fuel ratio learning unit has completed the learning, wherein before the completion of the learning by the upstream target air-fuel ratio learning unit, the diagnosis of degradation of the ternary catalyst is prohibited.

The control device for internal combustion engine according to this invention further includes a learning time cumulating unit that cumulates the time during which the upstream target air-fuel ratio learning unit is operating, wherein the learning completion judging unit determines the completion of the learning when a learning time cumulate value cumulated by the learning time cumulating unit exceeds a predetermined value.

The control device for internal combustion engine according to this invention further includes a learning value differentiating unit that differentiates an upstream target air-fuel ratio learning value learned by the upstream target air-fuel ratio learning unit, wherein the learning completion judging unit determines the completion of the learning when an absolute value of the learning value differentiation by the learning value differentiating unit is equal to or less than a predetermined value.

Also, in the control device for internal combustion engine according to this invention, when switching the upstream target air-fuel ratio, the target air-fuel ratio varying unit changes the air-fuel ratio to a stoichiometric ratio and then gradually changes the air-fuel ratio to a predetermined air-fuel ratio.

In the control device for internal combustion engine according to this invention, since the downstream air-fuel ratio feedback control unit is stopped or its control constant is set at a smaller value at the time of diagnosing degradation of the ternary catalyst, interference with the upstream air-fuel ratio feedback control can be restrained and deterioration in exhaust gas and drivability can be prevented.

Also, the control device for internal combustion engine according to this invention has the learning time cumulating unit that cumulates the time during which the upstream target air-fuel ratio learning unit is operating, and the learning completion judging unit determines the completion of the learning when the learning time cumulate value cumulated by the learning time cumulating unit exceeds a predetermined value After the learning of the upstream target air-fuel ratio is completed, the diagnosis of catalyst degradation is permitted. Therefore, the central air-fuel ratio of the air-fuel ratio variation can be maintained at the stoichiometric ratio and deterioration in the accuracy of the diagnosis of catalyst degradation can be prevented.

Moreover, in the control device for internal combustion engine according to this invention, the completion of the learning is determined when the absolute value of the learning value differentiation is equal to or less than a predetermined value, and the diagnosis of catalyst degradation is permitted after the learning of the upstream target air-fuel ratio is completed. Therefore, as described above, the central air-fuel ratio of the air-fuel ratio variation can be maintained at the stoichiometric ratio and deterioration in the accuracy of the diagnosis of catalyst degradation can be prevented.

Also, in the control device for internal combustion engine according to this invention, since the air-fuel ratio at the time of varying the air-fuel ratio is switched to the stoichiometric ratio and then gradually converged to a predetermined air-fuel ratio, an operation error in the quantity of oxygen change can be kept to the minimum and deterioration in drivability can be prevented.

DETAILED DESCRIPTION OF THE PREFERRED EMBODIMENTS

Embodiment 1

Figure 1:
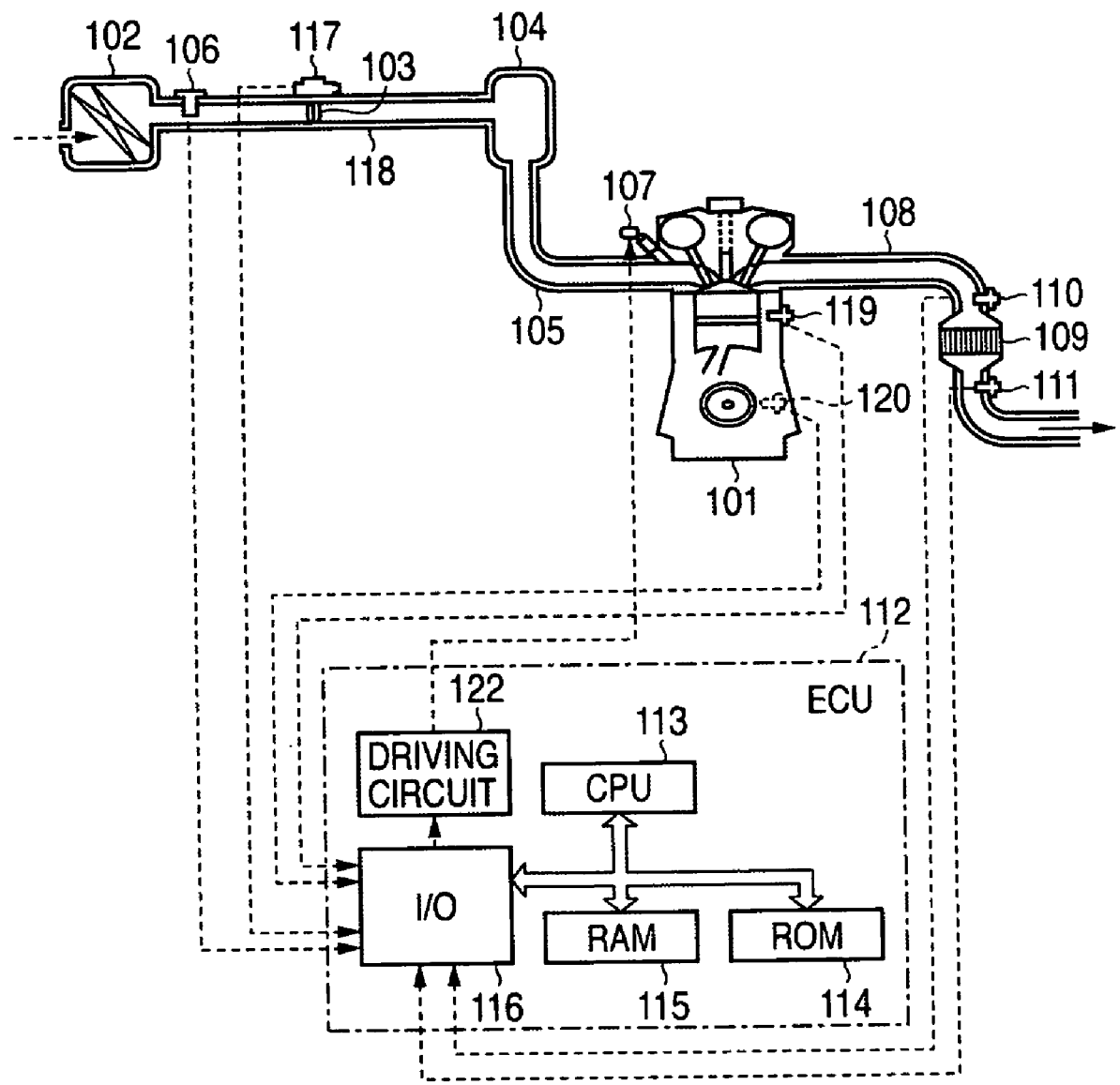
FIG. 1 shows a construction of a control device for internal combustion engine according to Embodiment 1 of this invention.

FIG. 1 shows a construction of a control device for internal combustion engine according to Embodiment 1 of this invention. It shows the whole device together with peripheral devices.

In FIG. 1, an intake tube 105 and an exhaust tube 108 are connected to an internal combustion engine 101. The intake tube 105 is connected to a surge tank 104 and is connected to an air cleaner 102 via an intake duct 118. A throttle valve 103 and a throttle opening sensor 117 that detects the opening of the throttle valve, and an air flow sensor 106 that detects the quantity of air intake are arranged midway in the intake duct 118. For each cylinder of the intake tube 105, an injector 107 that injects fuel by a driving circuit 122 of an engine control unit 112 is installed.

On the other hand, a catalyst converter (hereinafter referred to as ternary catalyst) 109 containing a ternary catalyst is arranged in the exhaust tube 108. Upstream from this ternary catalyst 109, a linear air-fuel ratio sensor 110 is provided, which is an upstream air-fuel ratio detecting unit that detects the air-fuel ratio of exhaust gas emitted from the engine. Downstream from the ternary catalyst 109, a rear λ sensor 111 is provided, which is a downstream air-fuel ratio detecting unit that detects the air-fuel ratio of the exhaust gas processed by the ternary catalyst. The linear air-fuel ratio sensor 110 is a sensor capable of linearly detecting the air-fuel ratio of the exhaust gas. The rear λ sensor 111 is a sensor-that shows a low voltage when the output suddenly changes at the stoichiometric ratio and the air-fuel ratio is lean, and that shows a high voltage when the air-fuel ratio is rich.

The engine control unit (hereinafter referred to as ECU) 112 has a central processing unit (hereinafter referred to as CPU) 113, a read-only memory (hereinafter referred to as ROM) 114, a random access memory (hereinafter referred to as RAM) 115, an input/output-interface 116 and the driving circuit 122 which are interconnected by bidirectional buses.

A crank angle sensor 120 outputs pulses corresponding to the number of rotations of the engine Ne. A water temperature sensor 119 detects the engine cooling water temperature. The above-described various sensor outputs are A/D-converted and taken into the CPU 113 via the input/output interface 116 of the ECU 112. The CPU 113 performs arithmetic operations to control the internal combustion engine 101.

Next, fuel injection control in this embodiment will be described.

The fuel injection time Tw to drive the injector 107 that injects fuel is calculated as follows:

$$Tw = Tb \times (1 + Cfb + Cetc) + Td$$

where Tb represents basic injection time, Td represents invalid time, Cfb represents quantity of upstream air-fuel ratio feedback correction, and Cetc represents quantity of other fuel corrections.

The basic injection time Tb that achieves the stoichiometric ratio is calculated by multiplying the quantity of intake air Qa/Ne per stroke calculated from the intake air flow rate Qa detected by the air flow sensor 106 and the number of engine rotations Ne, by a predetermined conversion gain.

The invalid time Td is to correct dead time during which fuel is not effectively injected even if the injector 107 is driven. The quantity of upstream air-fuel ratio feedback correction Cfb is the quantity of correction based on the air-fuel ratio feedback control by the linear air-fuel ratio sensor 110 and the rear λ sensor 111 installed before and after the ternary catalyst 109. Cetc shows the quantity of various fuel corrections, for example, water temperature correction to increase the quantity of fuel injection and make the air-fuel ratio rich when a low engine cooling water temperature is detected by the water temperature sensor 119.

Figure 2:
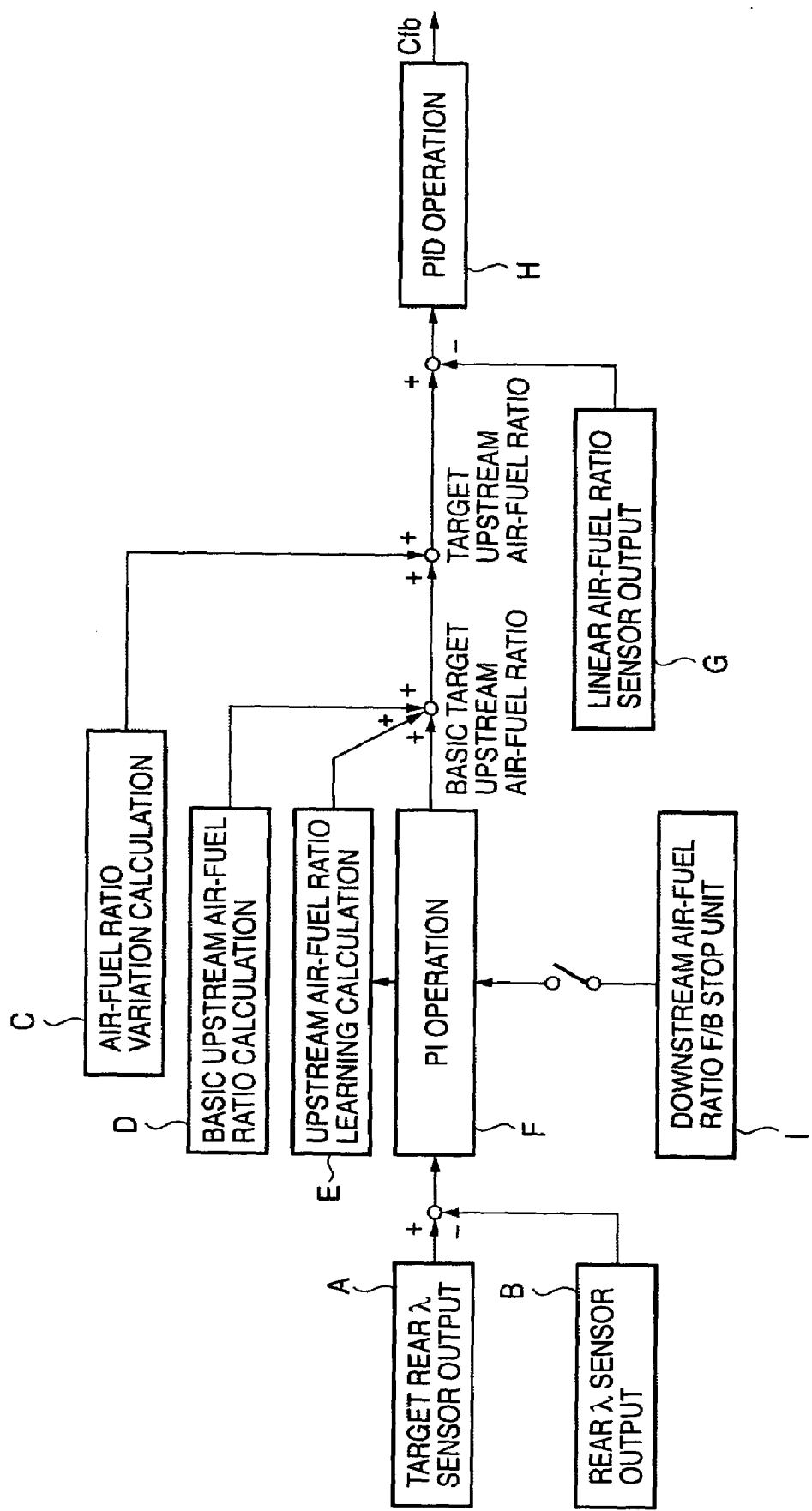
FIG. 2 is a block diagram showing calculation for catalyst degradation detection in the control device for internal combustion engine according to Embodiment 1 of this invention.

Now, air-fuel feedback control performed at the ECU 112 will be described in detail with reference to FIG. 2.

The quantity of upstream air-fuel ratio feedback correction Cfb is calculated by carrying out proportional, integral and differential (PID) operation H so that the output G of the linear air-fuel ratio sensor 110 coincides with a target upstream air-fuel ratio. Even when the injector 107 and the air flow sensor 106 vary, the upstream air-fuel ratio can be made coincident with the target upstream air-fuel ratio by the correction based on the PID operation H.

The target upstream air-fuel ratio is calculated by adding a value of air-fuel ratio variation calculation C, which will be described later, to a basic target upstream air-fuel ratio. The basic target upstream air-fuel ratio is calculated by adding a value of basic upstream air-fuel ratio calculation D, a value of upstream air-fuel ratio learning calculation E and a value of proportional and integral (PI) operation F. In the basic upstream air-fuel ratio calculation D, a basic upstream air-fuel ratio is referred to from a predetermined map on the basis of the number of engine rotations Ne and the load, and the upstream air-fuel ratio is set at such a value that the output of the rear λ sensor 111 coincides with a target rear λ sensor output A.

The target rear λ sensor output A is set as an output of the rear λ sensor 111 that achieves the maximum purification rate of the ternary catalyst 109, for example, about 0.76 [V]. The PI operation F is to correct the upstream air-fuel ratio so that the rear λ sensor output B coincides with the target rear λ sensor output A. It functions to compensate the variation due to the difference of catalysts and environmental changes and to constantly maintain the maximum catalyst purification rate. The upstream air-fuel ratio learning calculation E is to gradually shift the integration value in the PI operation F to the upstream air-fuel ratio learning value. It functions to learn the variation due to the difference of catalysts and environmental changes.

Next, the operation at the time of diagnosing catalyst degradation will be described with reference to the flowcharts of FIGS. 3 to 6.

Figure 3:
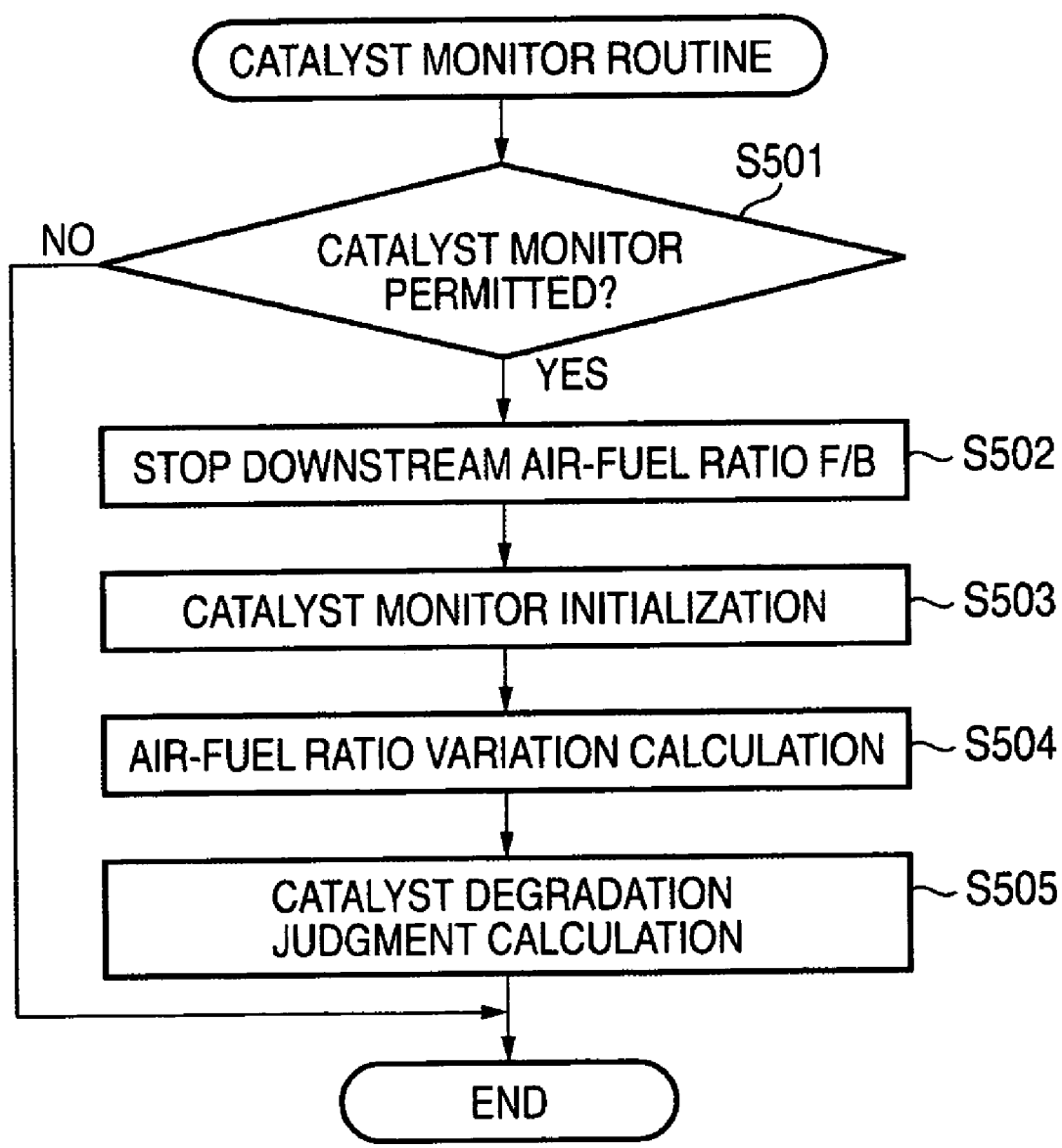
FIG. 3 is a flowchart showing a catalyst monitor routine in the control device for internal combustion engine according to Embodiment 1 of this invention.

FIG. 3 shows a routine executed at a predetermined time interval. First, at step S501, it is judged whether execution of catalyst monitor is permitted or not. To determine the permission to execute the catalyst monitor, not only the water temperature should be at a predetermined value or higher and the quantity of intake air should be within a predetermined range, but also the learning of the upstream air-fuel ratio should be complete. If all the conditions are met, a catalyst monitor execution permission flag is set.

Figure 6:
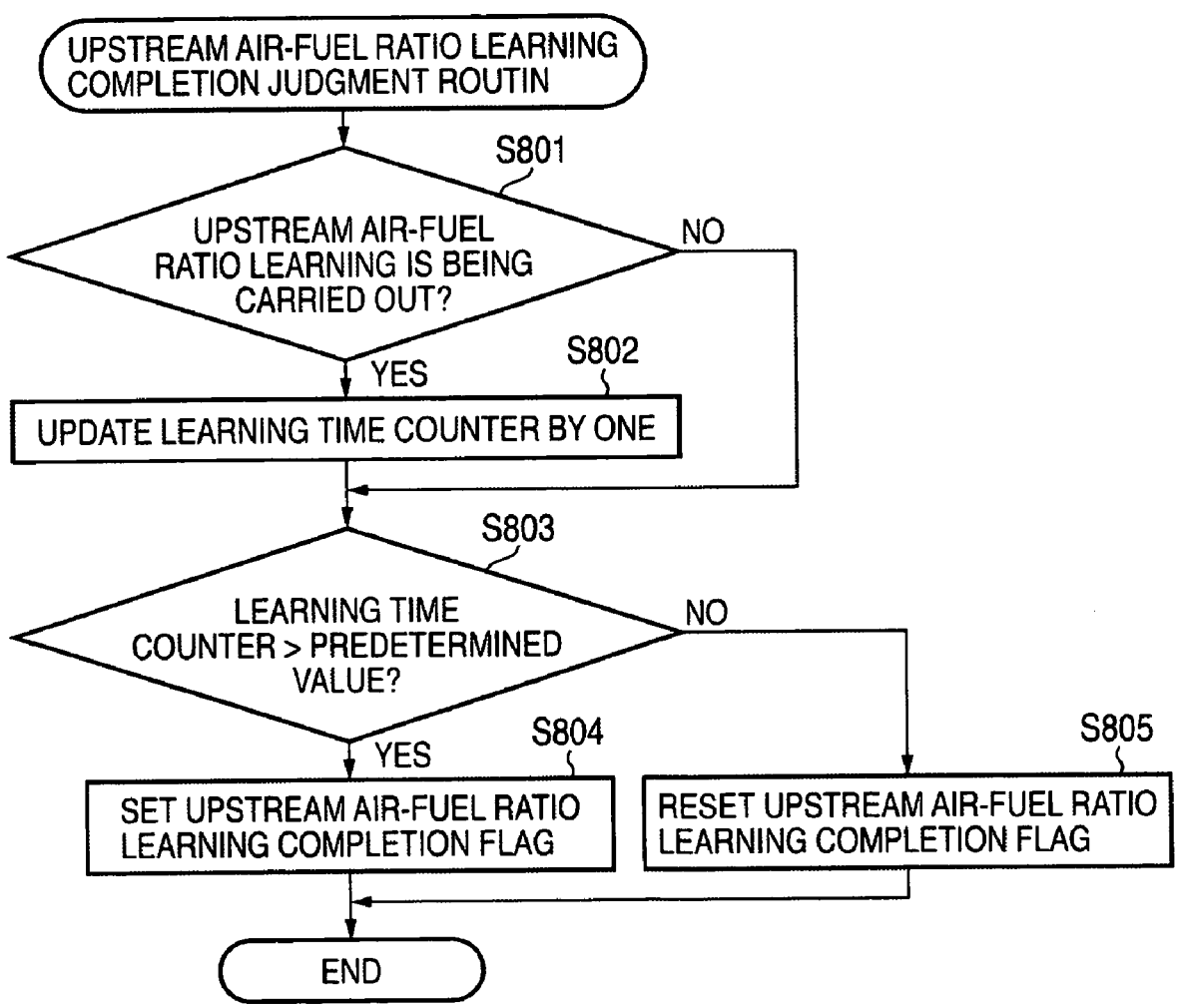
FIG. 6 is a flowchart showing an upstream air-fuel ratio learning completion judgment routine in the control device for internal combustion engine according to Embodiment 1 of this invention.

The judgment on the completion of the learning of the upstream air-fuel ratio will be described in detail with reference to the flowchart of FIG. 6.

The upstream air-fuel ratio learning completion judgment routine is to be executed at a predetermined time interval. First, at step S801, it is judged whether the upstream air-fuel ratio learning calculation E shown in FIG. 2 is being carried out or not. If the calculation is being carried out, the processing shifts to step S802 and the learning time counter is updated by one. If the calculation is not being carried out, the learning time counter is left unchanged and the processing shifts to step S803. At step S803, it is judged whether the value of the learning time counter is over a predetermined value or not. If it is over the predetermined value, it means that the learning of the upstream air-fuel ratio has been sufficiently done, and therefore an upstream air-fuel ratio learning completion flag is set. If it is not over the predetermined value, it means that the learning of the upstream air-fuel ratio is not sufficient. Therefore, the upstream air-fuel ratio learning completion flag is reset and the routine ends. On completion of the learning of the upstream air-fuel ratio, the summed value of the basic upstream air-fuel ratio and the upstream air-fuel ratio learning value, that is, the basic target upstream air-fuel ratio when the PI operation is stopped, reaches the stoichiometric ratio. The completion of the learning is thus determined when the learning time integration value exceeds a predetermined value, and the diagnosis of catalyst degradation is permitted after the learning of the upstream target air-fuel ratio is completed. Therefore, the central air-fuel ratio of the air-fuel ratio variation can be maintained at the stoichiometric ratio and deterioration in the accuracy of catalyst degradation diagnosis can be prevented.

Referring again to FIG. 3, the description of the operation at the time of diagnosing catalyst degradation will continue. When the catalyst monitor execution permission flag is set, the processing shifts to step S502 and the PI operation F shown in FIG. 2 is stopped to stop the downstream air-fuel ratio feedback control by the rear λ sensor 111. As the PI operation is stopped, interference with the upstream air-fuel ratio feedback, which might occur when the air-fuel ratio upstream from the ternary catalyst 109 is varied, can be prevented, and deterioration in exhaust gas and drivability can be prevented. Also, since the learning of the upstream air-fuel ratio has been completed in advance, the center of the air-fuel ratio variation is equal to the stoichiometric ratio and the accuracy of detection of catalyst degradation can be improved. Of course, it is possible to sufficiently reduce the proportional/integral gain of the PI control in the downstream air-fuel ratio feedback and thus prevent interference with the upstream air-fuel ratio feedback. Since the downstream air-fuel ratio feedback control unit is thus stopped or its control constant is reduced at the time of diagnosing catalyst degradation, interference with the upstream air-fuel ratio feedback control can be restrained and deterioration in exhaust gas and drivability can be prevented.

At step S503 in FIG. 3, when the catalyst monitor is started, the various parameters are initialized as follows:

air-fuel ratio inversion counter=0;

number of times the rear λ upper/lower limit is exceeded=0;

quantity of oxygen change=0;

air-fuel ratio rich/lean flag=1 (0:lean, 1:rich);

catalyst monitor completion flag=0 (0:incomplete, 1:complete); and degradation judgment flag=0 (0:non-degraded, 1:degraded).

Next, at step S504, the air-fuel ratio variation calculation C is carried out. As shown in FIG. 2, the result of the calculation is added to the basic target upstream air-fuel ratio, thus calculating the target upstream air-fuel ratio. From the output behavior of the rear λ sensor 111 when the air-fuel ratio is varied, the catalyst degradation judgment calculation is carried out at step S505, thus diagnosing whether the catalyst is degraded or not.

Now, the air-fuel ratio variation calculation will be described with reference to FIG. 4.

Figure 4:
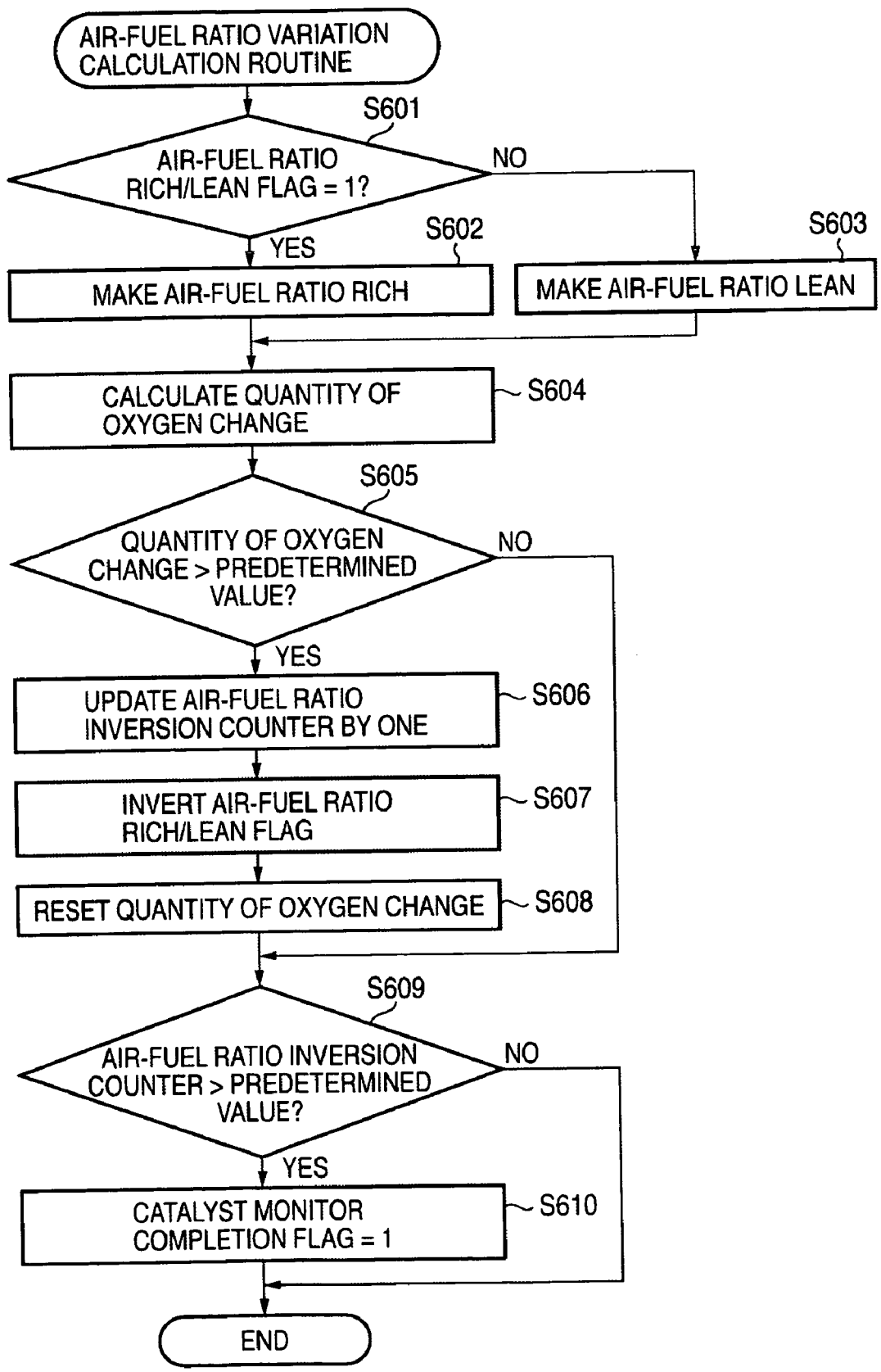
FIG. 4 is a flowchart showing an air-fuel ratio variation calculation routine in the control device for internal combustion engine according to Embodiment 1 of this invention.

FIG. 4 shows a flowchart of the air-fuel ratio variation calculation. First, at step S601, it is judged whether the air-fuel ratio rich/lean flag is 1 or not. If the flag is 1, the processing shifts to step S602 and the target upstream air-fuel ratio is made rich. If the flag is 0, the processing shifts to step S603 and the target upstream air-fuel ratio is made lean. The processing to make the target upstream air-fuel ratio rich or lean will be later described in detail with reference to FIGS. 7 and 8.

At step S604 in FIG. 4, the quantity of oxygen change ΔOSC is calculated as in the following equation:

$$\Delta OSC(i) = \Delta OSC(i-1) + |AF - AF0|/AF0 \times Qa \times \alpha$$

where AF represents upstream air-fuel ratio, AF0 represents basic target upstream air-fuel ratio, Qa represents quantity of intake air, and α represents conversion coefficient to oxygen mass.

At step S605, it is judged whether the quantity of oxygen change ΔOSC has reached the target quantity of oxygen change or not. If the target quantity of oxygen change is reached, the processing shifts to step S606 and the air-fuel ratio inversion counter is updated by one. In order to perform the similar operation with the air-fuel ratio inverted from rich to lean or from lean to rich, the air-fuel ratio rich/lean flag is inverted at step S607 and the quantity of oxygen change is reset to 0 at step S608.

To execute the air-fuel ratio variation a predetermined number of times in the diagnosis of catalyst degradation, it is detected at step S609 whether the air-fuel ratio inversion counter has reached a predetermined value or not. If the predetermined number of times is reached, the processing shifts to step S610 and the catalyst monitor completion flag is set, thus ending the catalyst monitor. If the predetermined number of times is not reached, the air-fuel ratio variation calculation routine ends and the processing returns to the catalyst monitor routine.

Figure 5:
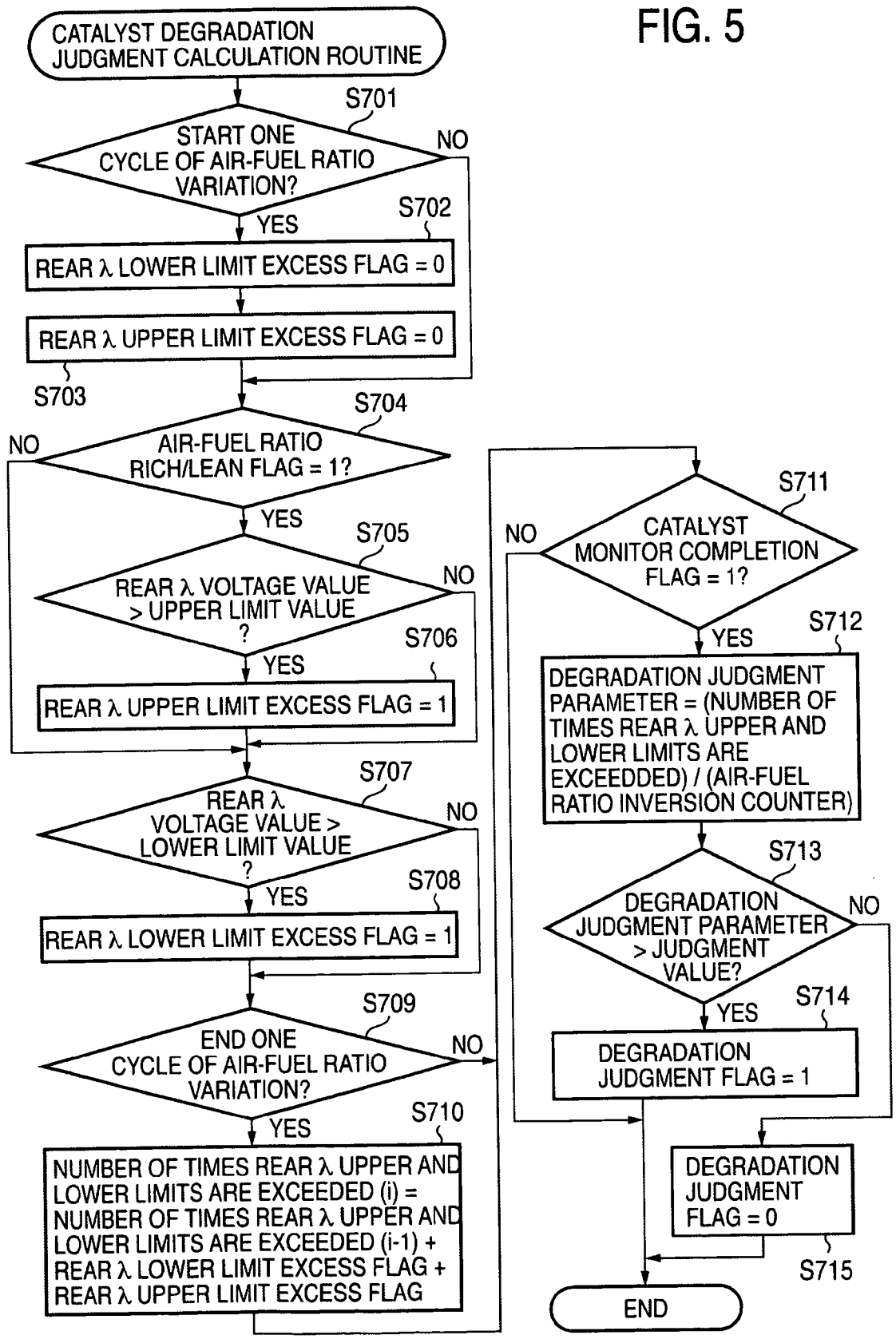
FIG. 5 is a flowchart showing a catalyst degradation judgment calculation routine in the control device for internal combustion engine according to Embodiment 1 of this invention.

The catalyst degradation judgment calculation will now be described with reference to FIG. 5.

In the calculation of the air-fuel ratio variation, one cycle includes making the air-fuel ratio rich and making the air-fuel ratio lean. The air-fuel ratio variation is executed a predetermined number of cycles and catalyst degradation is judged from the behavior of the rear λ sensor output. First, at step S701, it is detected that the air-fuel ratio rich/lean flag is changed to 1 (making the air-fuel ratio rich), and the start of an air-fuel ratio variation cycle is detected. Every time a cycle is started, a rear λ lower limit excess flag and a rear λ upper limit excess flag are reset (steps S702 and S703).

If the oxygen occlusion capability is lowered and the air-fuel ratio upstream from the catalyst is rich, also the air-fuel ratio downstream from the catalyst becomes rich. If the air-fuel ratio upstream from the catalyst is lean, also the air-fuel ratio downstream from the catalyst becomes lean. To detect these, at steps S704 to S706, it is detected whether the output of the rear λ sensor 111 has exceeded the upper limit value or not, during the time when the air-fuel ratio rich/lean flag is 1 (making the air-fuel ratio rich). If the output has exceeded the upper limit value once, the rear λ upper limit excess flag is set to 1 and it is held until one cycle of air-fuel ratio variation ends. On the other hand, when the air-fuel ratio rich/lean flag is 0 (making the air-fuel ratio lean), as shown in steps S707 and S708, it is detected whether the output of the rear λ sensor 111 has exceeded the lower limit value or not. If the output has exceeded the lower limit value once, the rear λ lower limit excess flag is set to 1 and it is held until one cycle of air-fuel ratio variation ends.

At step S709, it is detected that the air-fuel ratio rich/lean flag is changed from 0 to 1 and it is detected that one cycle of air-fuel ratio variation has ended. As one cycle of air-fuel ratio variation has ended, the processing shifts to step S710 and the number of times the rear λ upper and lower limits are exceeded is cumulated. If the rear λ sensor output has exceeded both the upper and lower threshold values, 2.0 is added. If the rear λ sensor output has exceeded either one, 1.0 is added. Nothing is added if the upper and lower threshold values are not exceeded.

At the time when the execution of catalyst monitor is ended, catalyst degradation judgment is carried out as shown in steps S711 to S715. First, at step S711, it is detected whether the catalyst monitor completion flag is set or not. If the catalyst monitor is completed, the processing shifts to step S712 and a degradation judgment parameter is calculated as in the following equation:

Degradation judgment parameter=(number of times the rear λ upper and lower limits are exceeded)/ (air-fuel ratio inversion counter)

If the catalyst is degraded, the oxygen occlusion capability is lowered and therefore the number of times the rear λ upper and lower limits are exceeded increases. Since the output of the rear λ sensor 111 exceeds the upper or lower threshold value every time the air-fuel ratio is inverted, the degradation judgment parameter reaches up to 1.0. On the other hand, if the catalyst is not degraded, the degradation judgment parameter is smaller. At step S713, the degradation judgment parameter is compared with a judgment value, for example, 0.5, to determine whether the degradation judgment parameter is equal to or less than the judgment value of 0.5. If the degradation judgment parameter is larger than the judgment value, it is determined that the catalyst is degraded and the degradation judgment flag is set (step S714). If the degradation judgment parameter is equal to or less than the judgment value, the degradation judgment flag is reset (step S715).

If it is judged that the catalyst is degraded, a malfunction indicator lamp (MIL) provided at the driver's seat is turned on to immediately notify the driver of the malfunction, thus prompting the driver to check and fix the malfunctioning part. In order to prevent misjudgment, the catalyst monitor routine may be repeated several times and degradation may be judged only when the degradation judgment flag continuously shows the same value a predetermined number of times.

Now, each parameter behavior at the time of executing the catalyst monitor will be described with reference to FIGS. 7 and 8.

Figure 7:
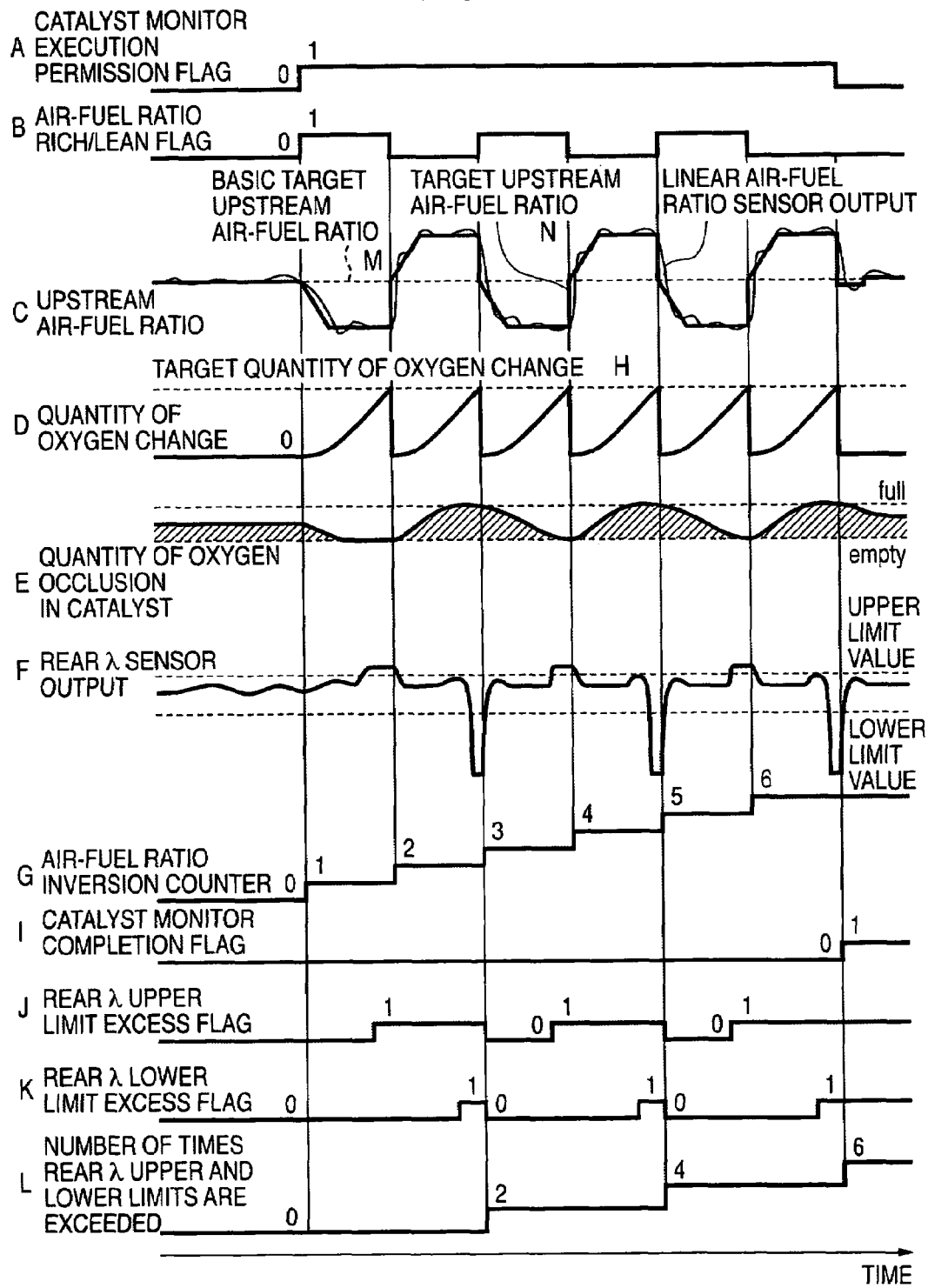
FIG. 7 is an explanatory view for explaining each parameter behavior at the time of catalyst monitoring in the control device for internal combustion engine according to Embodiment 1 of this invention.

FIG. 7 shows a case of degraded catalyst. First, when a catalyst monitor execution permission flag A is set and catalyst monitor is executed, an air-fuel ratio rich/lean flag B is set to 1 (making the air-fuel ratio rich). As the air-fuel ratio rich/lean flag B is set to 1, the air-fuel ratio is gradually made rich to reach a predetermined target upstream air-fuel ratio with a predetermined tailing coefficient. At the same time, the quantity of oxygen change is calculated. When a target quantity of oxygen change H is reached, the air-fuel ratio inversion counter is updated by one, then the air-fuel ratio rich/lean flag B is inverted, and the quantity of oxygen change D is reset to 0. At the same time, the quantity of air-fuel ratio variation is reset to 0 and a target upstream air-fuel ratio N is returned to a basic target upstream air-fuel ratio M. In this manner, at the time of varying the air-fuel ratio, the air-fuel ratio is switched to the stoichiometric ratio and then gradually converged to a predetermined air-fuel ratio. Therefore, an operation error in the quantity of oxygen change D can be kept to the minimum while deterioration in drivability can be prevented. (If the air-fuel ratio is varied in the form of triangular wave, the air-fuel ratio is not inverted even after the target quantity of oxygen change is exceeded, and degradation misjudgment may occur.) At this point, as the air-fuel ratio is made rich, the quantity of oxygen occlusion in the catalyst E is reduced to 0. Then, a rear λ sensor output F exceeds the upper limit value and a rear λ upper limit excess flag J is set to 1.

When the air-fuel ratio rich/lean flag B is inverted and set to 0 (making the air-fuel ratio lean), the air-fuel ratio is gradually made lean to reach a predetermined target upstream air-fuel ratio with a predetermined tailing coefficient. At the same time, the quantity of oxygen change D is calculated. When the target quantity of oxygen change H is reached, the air-fuel ratio inversion counter G is updated by one, then the air-fuel ratio rich/lean flag B is inverted, and the quantity of oxygen change D is reset to 0. At the same time, the quantity of air-fuel ratio variation is reset to 0 and the target upstream air-fuel ratio N is returned to the basic target upstream air-fuel ratio M. At this point, as the air-fuel ratio is made lean, the quantity of oxygen occlusion in the catalyst increases and becomes saturated. Then, the rear λ sensor output F exceeds the lower limit value and a rear λ lower limit excess flag K is set to 1. Every time one cycle of air-fuel ratio variation ends, the number of times the rear λ upper and lower limits are exceeded is calculated.

When the catalyst monitor is completed, a degradation judgment parameter is calculated. In this example, the degradation judgment parameter is calculated as follows:

$$\text{degradation judgment parameter} = (\text{number of times the rear } \lambda \text{ upper and lower limits are exceeded}) / (\text{air-fuel ratio inversion counter})$$
$$= 6/6$$
$$= 1.0$$

Since it is over the judgment value (0.5), the catalyst is diagnosed as being degraded and the degradation judgment flag is set.

Figure 8:
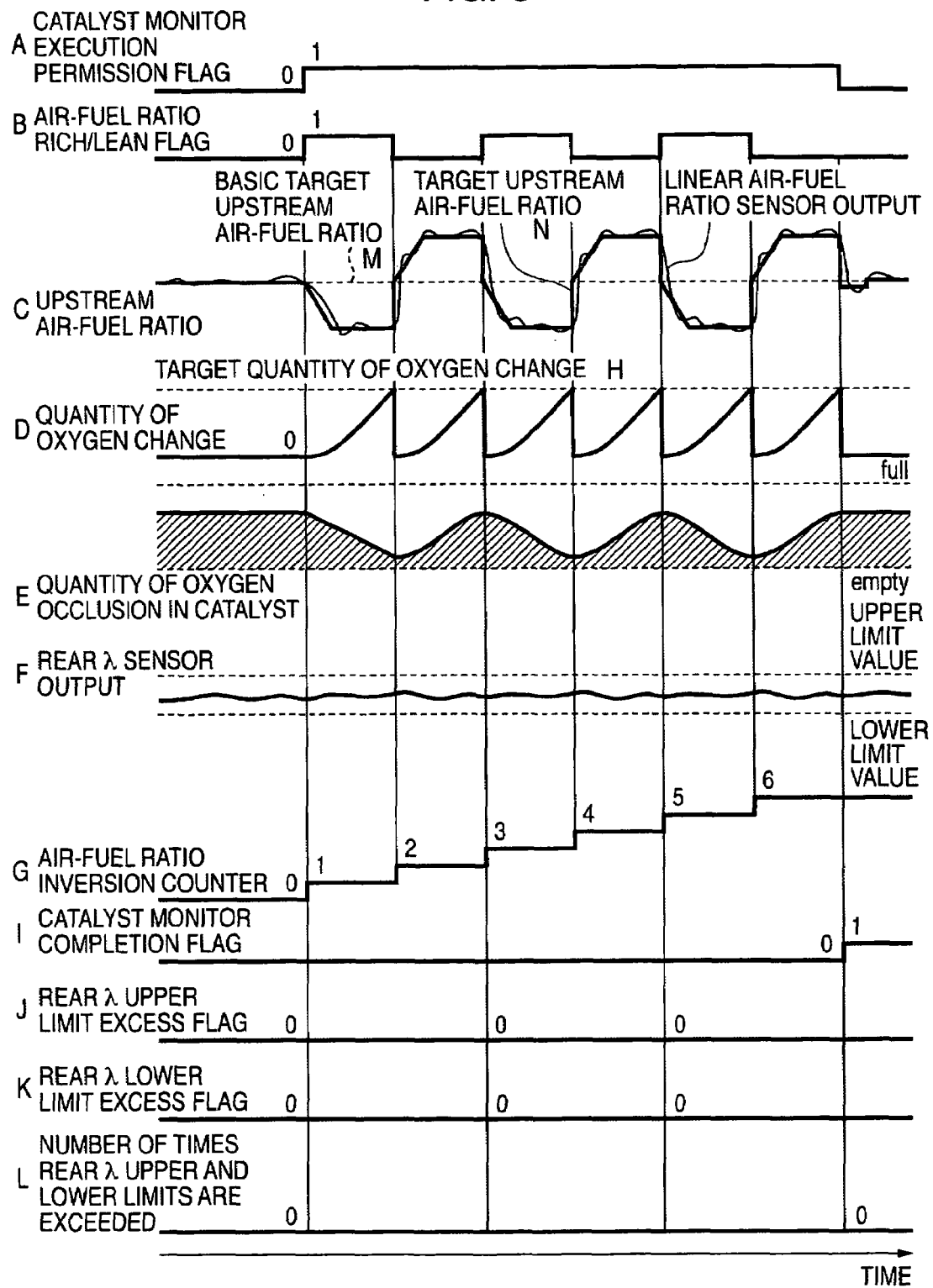
FIG. 8 is an explanatory view for explaining each parameter behavior at the time of catalyst monitoring in the control device for internal combustion engine according to Embodiment 1 of this invention.

Meanwhile, if, for example, a new catalyst is used, the result is as shown in FIG. 8. Even when the air-fuel ratio is varied, since the quantity of oxygen occlusion in the catalyst E is within the oxygen occlusion capability range, the quantity of oxygen occlusion in the catalyst E does not become 0 or saturated. Therefore, the air-fuel ratio in the catalyst is constantly kept at about the stoichiometric ratio and the rear λ voltage is stabilized at around 0.76 [V]. In this case, the degradation judgment parameter is expressed as follows:

$$\text{degradation judgment parameter} = (\text{number of times the rear } \lambda \text{ upper and lower limits are exceeded}) / (\text{air-fuel ratio inversion counter})$$
$$= 0/6$$
$$= 0.0$$

Since it is not over the judgment value, the catalyst is diagnosed as being degraded and the degradation judgment flag is reset.

Embodiment 2

Embodiment 2 is adapted for judging the completion of the learning of the upstream air-fuel ratio. The part described with reference to FIG. 6 should be replaced with FIG. 9, but the other parts are similar to those of Embodiment 1. The upstream air-fuel ratio learning completion judgment routine will be described with reference to FIGS. 9 and 10.

Figure 9:
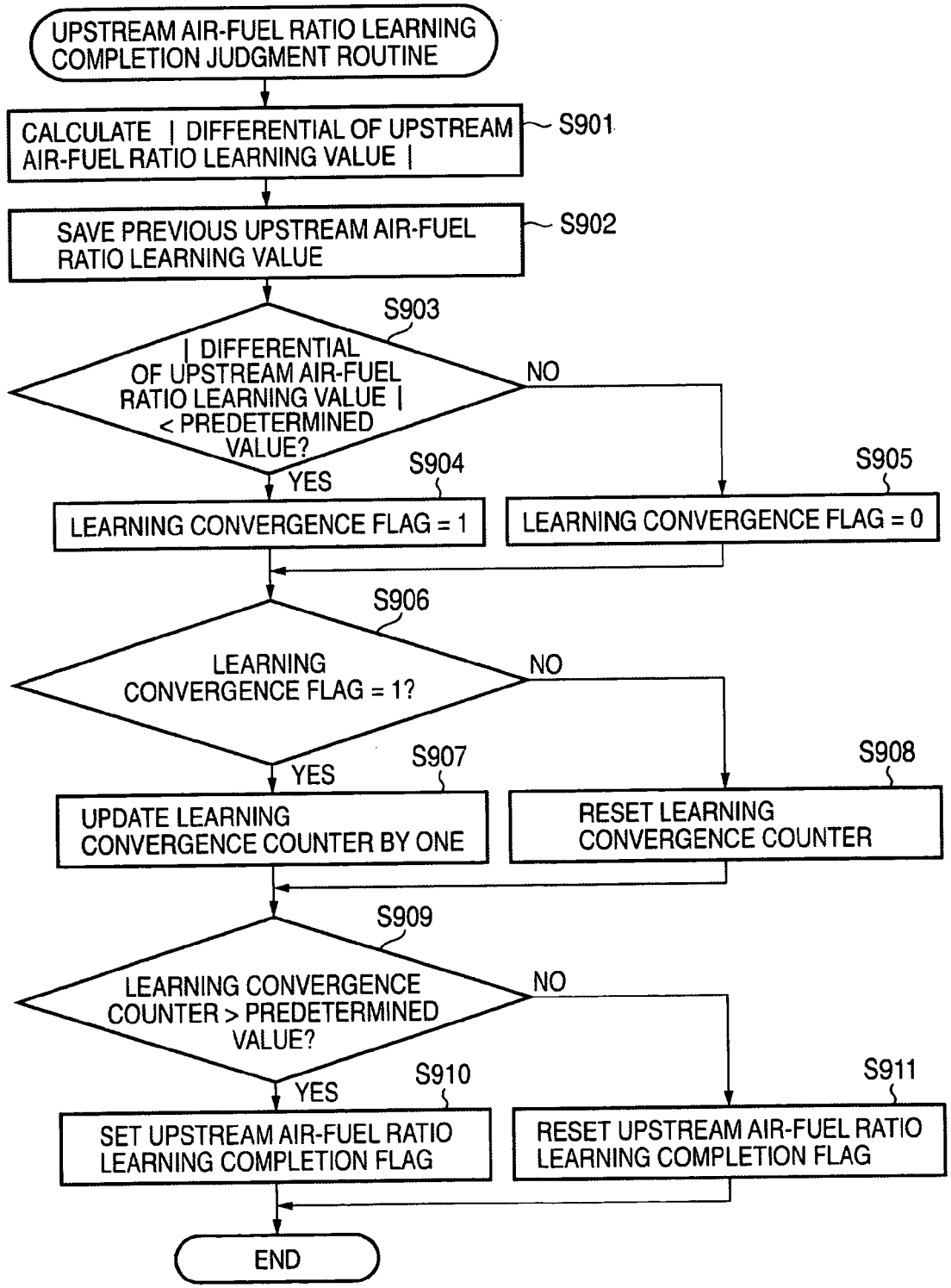
FIG. 9 s a flowchart showing an upstream air-fuel ratio learning completion judgment routine in a control device for internal combustion engine according to Embodiment 2 of this invention.

FIG. 9 shows the upstream air-fuel ratio learning completion judgment routine, which is calculated at a predetermined time interval. First, at step S901, an absolute value of differentiation of the upstream air-fuel ratio learning value is calculated from the current and previous upstream air-fuel ratio learning values. At step S902, the current upstream air-fuel ratio learning value is saved as a previous value for the next calculation.

At steps S903 to S905, if the absolute value of the differentiation of the upstream air-fuel ratio learning value is smaller than a predetermined value, it is judged that the learning is converged and a learning convergence flag is set to 1. If the absolute value is equal to or larger than the predetermined value, it is judged that the learning is not converged and the learning convergence flag is reset to 0.

At steps S906 to S908, if the learning convergence flag has been set to 1, a learning convergence counter is updated by one. If the learning convergence flag has been reset to 0, the learning convergence counter is reset to 0. As the learning convergence flag is set continuously a predetermined number of times, the judgment at step S909 turns out to be "Yes" and the processing shifts to step S910. Then, it is judged that the learning of the upstream air-fuel ratio is complete, and the upstream air-fuel ratio learning completion flag is set to 1. Otherwise, the processing shifts to step S911 and the upstream air-fuel ratio learning completion flag is reset to 0.

Figure 10:
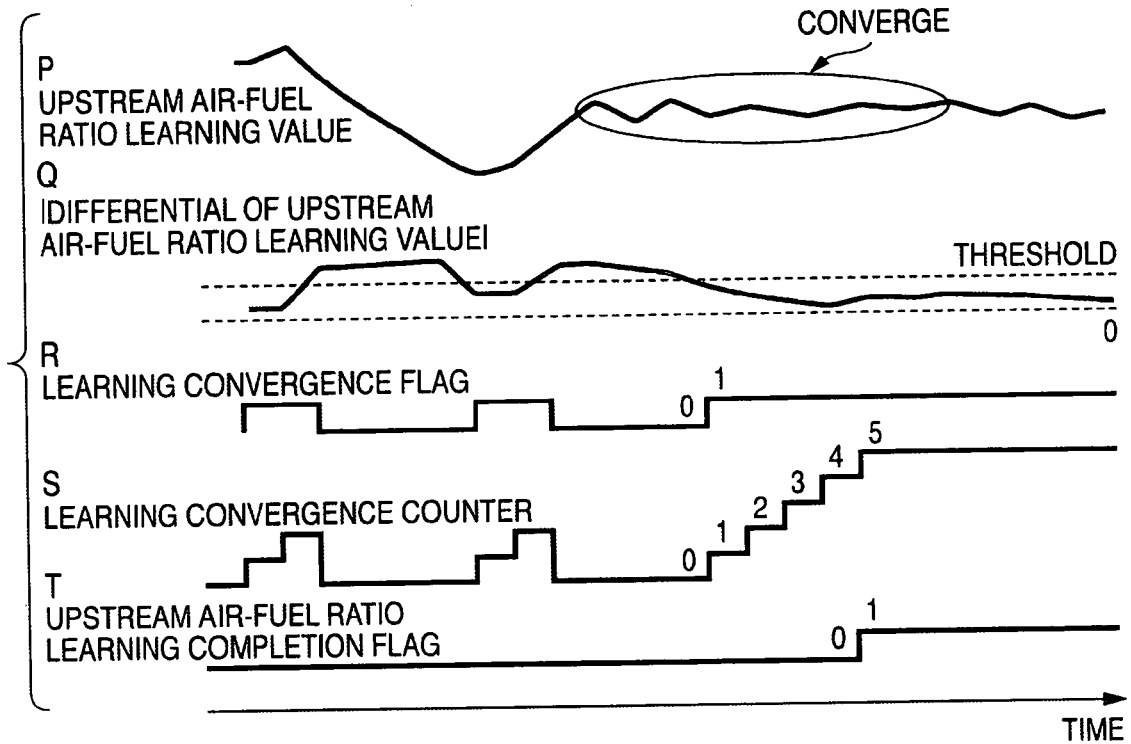
FIG. 10 is an explanatory view for explaining an upstream air-fuel ratio learning completion judgment behavior in the control device for internal combustion engine according to Embodiment 2 of this invention.
Figure 11:
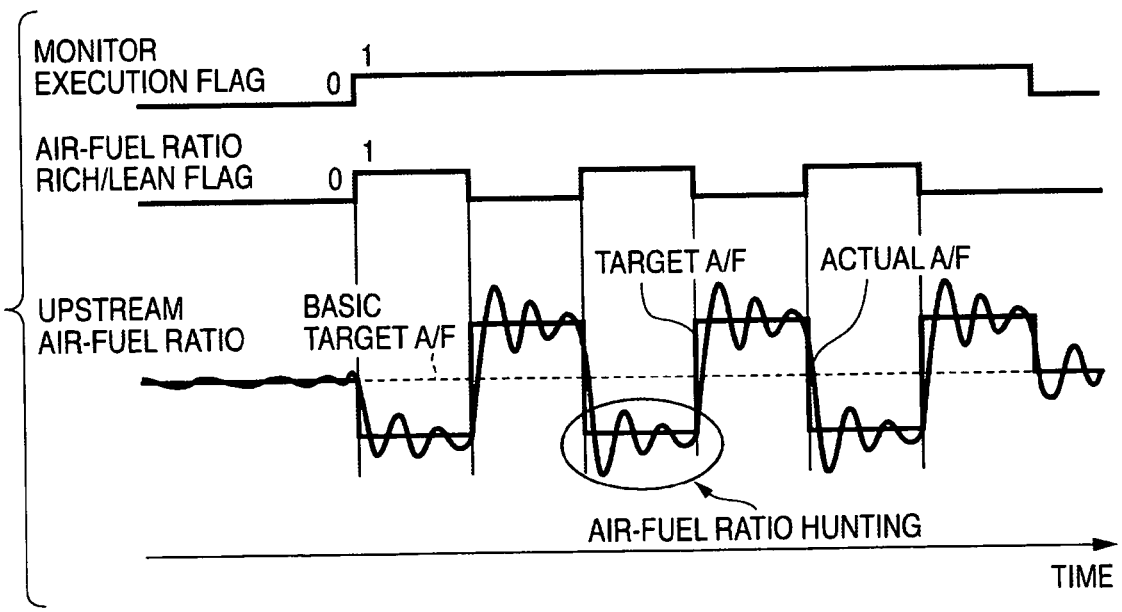
FIG. 11 is an explanatory view for explaining the principle of catalyst degradation detection by an air-fuel ratio sensor.
Figure 12:
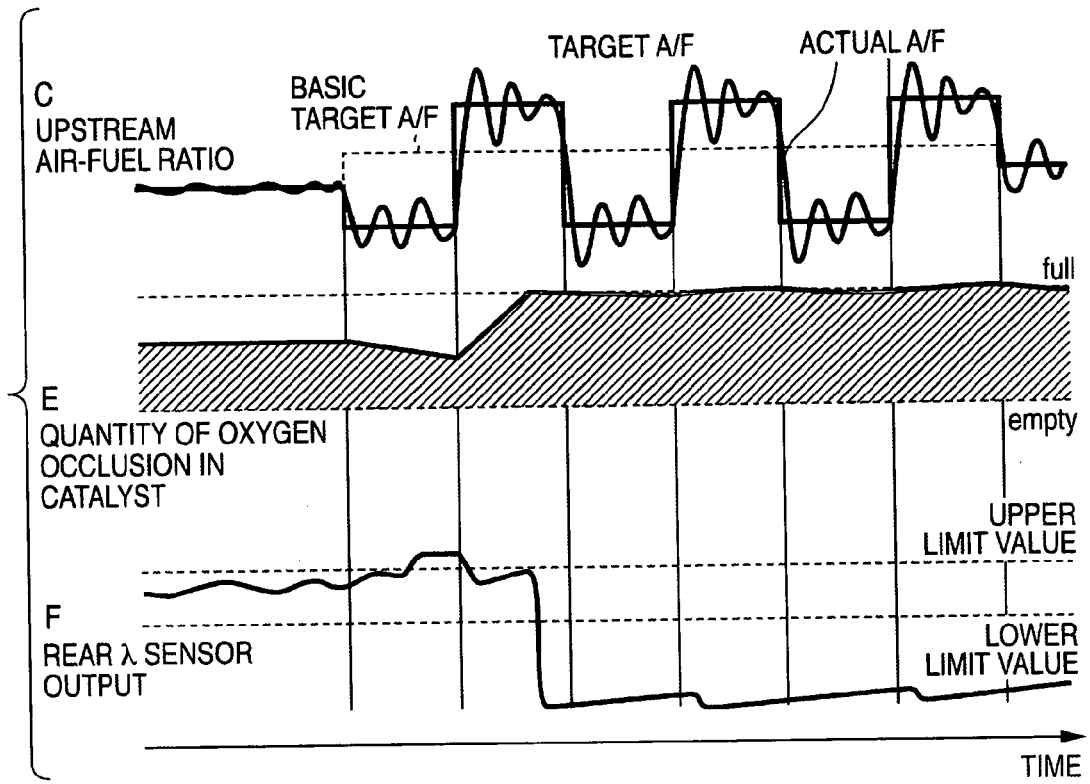
FIG. 12 is an explanatory view for explaining a problem in catalyst monitoring in a conventional device.
Figure 13:
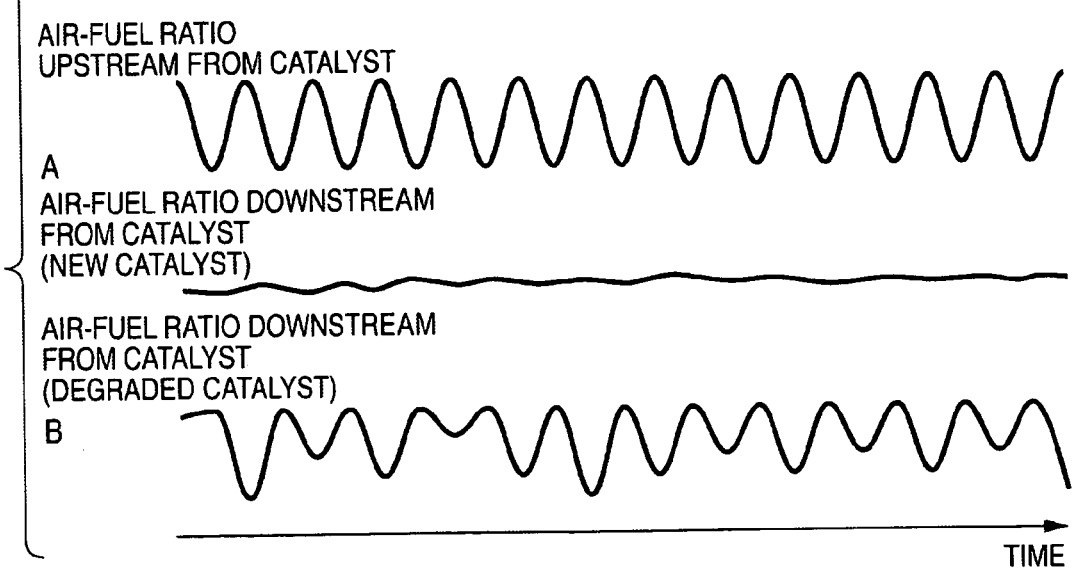
FIG. 13 is an explanatory view for explaining a problem in catalyst monitoring in a conventional device.
Figure 14:
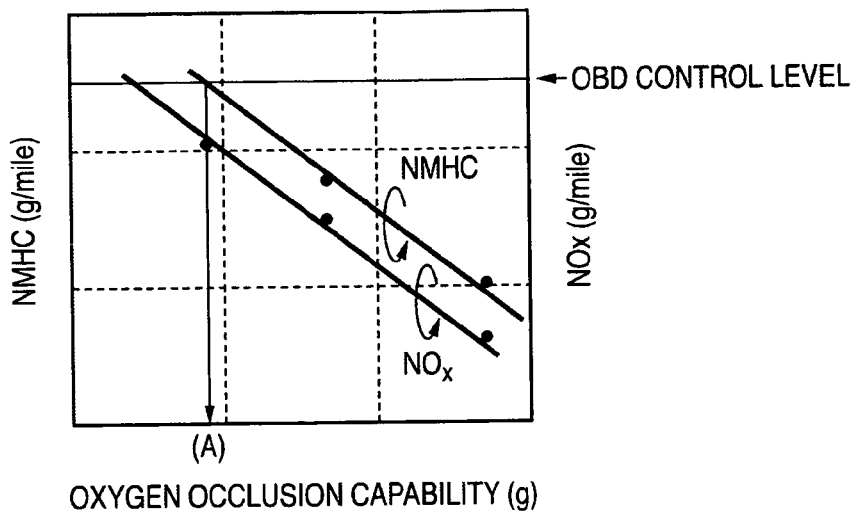
FIG. 14 is an explanatory view showing the relation between the oxygen occlusion capability of a catalyst and the quantity of exhaust gas.
Figure 15:
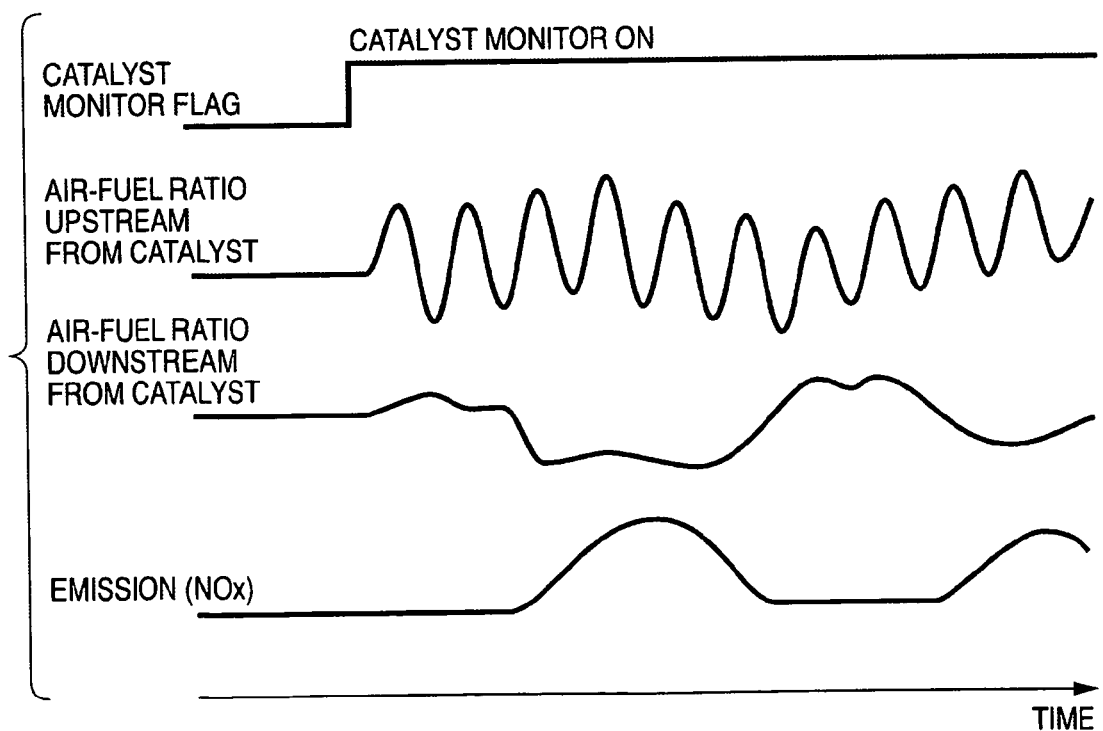
FIG. 15 is an explanatory view for explaining a problem in catalyst monitoring in a conventional device.

For example, as shown in FIG. 10, as the upstream air-fuel ratio learning value P is converged, the absolute value of the differentiation Q of the upstream air-fuel ratio learning value is continuously equal to or less than the threshold value. Therefore, the learning convergence counter S sequentially increases. If the learning convergence flag stands continuously five times or more, the upstream air-fuel ratio learning completion flag T is set. As described above, according to this embodiment, it is judged that the learning is complete when the learning time cumulate value is over a predetermined value, and after the learning of the upstream air-fuel ratio is completed, the diagnosis of catalyst degradation is permitted. Therefore, the central air-fuel ratio in the air-fuel ratio variation can be maintained at the stoichiometric ratio and deterioration in the accuracy of the catalyst degradation diagnosis can be prevented.

What is claimed is:

1. A control device for internal combustion engine comprising: a ternary catalyst arranged in an exhaust system of an internal combustion engine; an upstream air-fuel ratio detecting unit that is arranged in the exhaust system upstream from the ternary catalyst and detects an upstream air-fuel ratio of exhaust gas of the internal combustion engine; an upstream air-fuel ratio feedback control unit that performs feedback control of the quantity of fuel injection to the internal combustion engine so that the upstream air-fuel ratio detected by the upstream air-fuel ratio detecting unit coincides with an upstream target air-fuel ratio; a downstream air-fuel ratio detecting unit that is arranged in the exhaust system downstream from the ternary catalyst and detects a downstream air-fuel ratio of the exhaust gas; a downstream air-fuel ratio feedback control unit that performs feedback control of the upstream target air-fuel ratio so that the downstream air-fuel ratio detected by the downstream air-fuel ratio detecting unit coincides with a downstream target air-fuel ratio; a target air-fuel ratio varying unit that varies the upstream target air-fuel ratio at the time of diagnosing degradation of the ternary catalyst; and a catalyst degradation judging unit that judges degradation of the catalyst from the behavior of the downstream air-fuel ratio at the time of diagnosing degradation of the ternary catalyst; wherein at the time of diagnosing degradation of the ternary catalyst, the downstream air-fuel ratio feedback control unit is stopped or its control constant is set at a smaller value.

2. The control device for internal combustion engine as claimed in claim 1, further comprising an upstream target air-fuel ratio learning unit that learns the upstream target air-fuel ratio, and a learning completion judging unit that judges that the upstream target air-fuel ratio learning unit has completed the learning, wherein before the completion of the learning by the upstream target air-fuel ratio learning unit, the diagnosis of degradation of the ternary catalyst is prohibited.

3. The control device for internal combustion engine as claimed in claim 2, further comprising a learning time cumulating unit that cumulates the time during which the upstream target air-fuel ratio learning unit is operating, wherein the learning completion judging unit determines the completion of the learning when a learning time cumulate value cumulated by the learning time cumulating unit exceeds a predetermined value.

4. The control device for internal combustion engine as claimed in claim 2, further comprising a learning value differentiating unit that differentiates an upstream target air-fuel ratio learning value learned by the upstream target air-fuel ratio learning unit, wherein the learning completion judging unit determines the completion of the learning when an absolute value of the learning value differentiation by the learning value differentiating unit is equal to or less than a predetermined value.

5. The control device for internal combustion engine as claimed in claim 1, wherein when switching the upstream target air-fuel ratio, the target air-fuel ratio varying unit changes the air-fuel ratio to a stoichiometric ratio and then gradually changes the air-fuel ratio to a predetermined air-fuel ratio.

* * * * *